US011767173B2

(12) United States Patent
Cossais et al.

(10) Patent No.: US 11,767,173 B2
(45) Date of Patent: Sep. 26, 2023

(54) SYSTEM FOR HANDLING PLATES IN A MACHINE PROCESSING CONTAINERS (71) Applicant: SYNERLINK, Puiseux Pontoise (FR)

(72) Inventors: Dominique Cossais, Sainte Geneviève des Bois (FR); Patrick Massot, Joue l'Abbe (FR); Gaëtan Doiteau, Le Mans (FR); Jean-Michel Royer, Puiseux Pontoise (FR)

(73) Assignee: SYNERLINK, Puiseux Pontoise (FR)

( * ) Notice: Subject to any disclaimer, the term of this patent is extended or adjusted under 35 U.S.C. 154(b) by 0 days.

(21) Appl. No.: 17/721,513

(22) Filed: Apr. 15, 2022

(65) Prior Publication Data
US 2022/0332511 A1 Oct. 20, 2022

(30) Foreign Application Priority Data

Apr. 16, 2021 (FR) ...................................... 21 03969

(51) Int. Cl.
B65G 35/06 (2006.01)
B65B 43/60 (2006.01)
B67C 3/22 (2006.01)
B67C 3/24 (2006.01)

(52) U.S. Cl.
CPC .............. B65G 35/06 (2013.01); B65B 43/60 (2013.01); B67C 3/225 (2013.01); B67C 3/242 (2013.01); B65G 2201/0247 (2013.01)

(58) Field of Classification Search
CPC ........ B65G 35/06; B65G 25/02; B65G 17/16; B65G 2201/0247; B65G 47/38; B65B 43/60; B67C 3/225; B67C 3/242

USPC ............................ 198/377.1, 377.02, 377.01
See application file for complete search history.

(56) References Cited

U.S. PATENT DOCUMENTS 2,642,212 A * 6/1953 Currivan ................. B65B 21/04
 198/377.02
3,490,575 A * 1/1970 Herrmann .............. B65G 29/00
 198/377.01
3,814,153 A 6/1974 Schmidt
(Continued)

FOREIGN PATENT DOCUMENTS

CH 568814 A5 11/1975
CN 111017487 * 2/2020 ............. B65G 23/20
(Continued)

OTHER PUBLICATIONS

Preliminary Search Report dated Dec. 13, 2021, corresponding to French Application No. 2103969, 9 pages.

*Primary Examiner* — James R Bidwell
(74) *Attorney, Agent, or Firm* — Maier & Maier, PLLC (57) ABSTRACT A handling system in a machine for processing containers, including a plurality of support plates circulating in a closed circuit, each support plate including one or more housings, each housing being able to hold a container, a working portion, in which the support plates circulate in a horizontal position, with a first member for moving the support plates along a first axial direction, a rapid return portion, with a second moving member configured to move the support plates along an opposite axial direction, the support plates circulating in the return portion in a vertical return orientation, the handling system including rotation stations for pivoting the support plates.

12 Claims, 9 Drawing Sheets (56) References Cited

U.S. PATENT DOCUMENTS

| | | | |
|---|---|---|---|
| 6,293,387 B1 * | 9/2001 | Forster | B65G 47/248 |
| | | | 198/795 |
| 8,528,722 B2 * | 9/2013 | Clerkx | C23C 14/562 |
| | | | 414/754 |
| 10,233,032 B1 * | 3/2019 | Xie | B65G 47/38 |
| 2010/0050574 A1 | 3/2010 | Cedrone | |
| 2013/0118863 A1 | 5/2013 | Junk | |

FOREIGN PATENT DOCUMENTS

| | | |
|---|---|---|
| EP | 2070843 A1 | 6/2009 |
| EP | 3040296 A1 | 7/2016 |
| EP | 0995700 A1 | 4/2020 |
| JP | H06-171750 A | 6/1994 |
| JP | H07204966 A | 8/1995 |
| JP | 2012246057 A | 12/2012 |
| JP | 201923113 A | 2/2019 |
| JP | 2019137499 A | 8/2019 |
| WO | 2019179657 A1 | 9/2019 |

* cited by examiner

SYSTEM FOR HANDLING PLATES IN A MACHINE PROCESSING CONTAINERS

FIELD

The present invention relates to handling systems in a machine processing containers for food products. These machines may also be referred to as production equipment or lines.

BACKGROUND

These machines (or "equipment" or "lines") are used to fill containers, for example pots or bottles, with one or more food products, for example a dairy product and/or food components, and to hermetically seal these containers, also optionally with marking, labelling, prior disinfection or some other operation.

These machines/equipment use supports, for example plates, to support the containers during the operations carried out in the machine.

These supports travel through a closed loop, returning empty after the processed container(s) have been unloaded from them.

This type of support plate is also used in machines or installations which process containers for non-food products, to which the present invention may be applied.

The inventors noted, however, that the return circuit for the support plates took up a large amount of space in such an installation, and that the return took place below or above or at the same level with respect to the working portion. Generally, the plates travel along the return circuit, in a position parallel to the position of the working circuit, in an orientation identical to the working circuit or after having been turned through 180°.

SUMMARY

A need has therefore arisen to provide an improvement to the support plate circuit.

To this end, a handling system in a machine for processing containers intended to hold a food product is therefore proposed, the handling system comprising:
- a plurality of support plates circulating in a closed circuit, each support plate comprising one or more housings, each housing being able to hold a container,
- a first portion TC1, known as the working portion, in which the support plates circulate in a horizontal position in a first axial direction X1A, with a first member for moving the support plates along the first axial direction, the first member preferably being of the stepping type, the support plate being driven at only one of its two longitudinal sides,
- a second portion TC2, known as the rapid return portion, with a second moving member configured to move the support plates along a second axial direction X1B opposite to the first axial direction, wherein the support plates circulate in the second portion in a return orientation, said return orientation being vertical or angularly less than 30° away from the vertical, and wherein the handling system comprises:
- a first rotation station arranged at a first end E1 of the handling system and configured to pivot the support plates into the horizontal position in order to engage them in the first portion TC1,
- a second rotation station arranged at a second end E2 of the handling system and configured to pivot the support plates into the return orientation in order to engage them in the second portion TC2.

By virtue of these provisions, the return path of the plates takes up less space. The overall compactness of the machine/line can be improved. Similarly, the footprint of the machine can be reduced. In addition, this disposition of the handling system makes it easier to access the different elements and members of the production line, in particular for monitoring and maintenance purposes.

In a simplest configuration, the first and second portions TC1 and TC2 are substantially the same length and straight, thereby forming a simple and economically reasonable structure.

In other words, if a longitudinal working axis (i.e. of the machine) denoted X and a longitudinal reference axis of the handling system denoted X1 are defined, at the end of the working portion, the support plate is rotated about the longitudinal reference axis X1 through an angle θ (90° in a typical case) and then the plate travels through the return portion substantially maintaining this orientation, after which the support plate is rotated in the opposite direction about the longitudinal axis X1 through an angle −θ.

Note that, in the first portion, the plate is driven at only one of its two longitudinal edges/sides, the opposite edge/side being only guided but not driven. The drive (i.e. moving member) is thus relatively simple and is located in the vicinity of the longitudinal axis X1 of the handling system.

Note that, also in the second portion, the plate is only driven close to the same longitudinal edge/side, the opposite edge/side not being driven, preferably the opposite edge/side being free of interaction, just hanging.

As regards the orientation of the support plates, the shape of the plates is defined by their two main dimensions, which can be referred to as length and width, and by a substantially smaller dimension referred to as thickness. The plate orientation is said to be horizontal when the two main dimensions extend horizontally and the thickness extends vertically, and the plate orientation is said to be vertical when the thickness extends in a horizontal direction.

A "stepping moving member" should be understood as being a mechanism that allows a forward movement by a predefined distance following by stopping for processing at a fixed station. A "stepping moving member" can also be called "stepper mover"

Note, however, that a continuous advancing mechanism in the first portion is not precluded in the scope of the application of the present invention.

As regards the return portion, the second moving member may be of the continuous or discontinuous type.

In various embodiments of the invention, it may be possible to also use one and/or another of the following provisions, taken individually or in combination.

According to one aspect, the first rotation station PR1 comprises a first rotary base 41 and the second rotation station PR2 comprises a second rotary base 42 and a fixed main guiding support 40, disposed continuously along the first axial direction X1A, is provided between the first and second rotary bases. Note 'rotary base' can also be called 'rotary socket'.

The first rotary base pivots the support plates into the horizontal position in order to engage them in the first portion while the second rotary base pivots the support plates into the return orientation in order to engage them in the second portion.

This thus forms a simple and reliable solution for implementing the pivoting movements and guidance in the first working portion.

Moreover, by virtue of the fixed main guiding support, positive and continuous guidance of the plates from the first end E1 to the second end E2 is provided in the first portion TC1. Note here that the guidance in the second portion (the rapid return portion) may be somehow simple or absent, or even flexible guidance is enough, by suspension for example.

According to one aspect, the first rotation station and/or the second rotation station may be other than a rotary base, and be realized via a cam effect with gradual rotation and forward movement.

According to one aspect, each support plate comprises at least one notch for receiving a finger of the first moving member. Optionally, two notches may preferably be provided in each support plate.

Use may be made of a stepping advancing actuator that engages the notches of the different support plates. With one notch per plate, forward movement preferably takes place with a pitch substantially equal to the length of the plate. With two notches per plate, forward movement may take place with a pitch equal to the length of the plate or a pitch equal to half the length of the plate.

Moreover, four notches may be provided per plate, for kinematics for moving forward by a quarter of the length of the plate.

According to one aspect, the notch is a through-notch. This is easy to clean and prevents contaminants from getting trapped in a blind hole.

According to one aspect, the notch is arranged in the edge face of the plate. Such a form is easy to produce and also easy to clean.

According to one aspect, the first moving member comprises two degrees of freedom, namely rotation about the axial direction X1 and forward movement along the axial direction X1.

According to one aspect, the first moving member comprises a finger at a distance from the axis X1 and configured to be received in a notch in the plate, the finger being unladen when the finger is not engaged.

Thus, the first moving member can be referred to as a "transfer shuttle". According to possible configurations, it may bring about a forward movement by a quarter, half or the entire axial length of a support plate.

According to one aspect, each support plate extends generally in a reference plane PR with a rectangular overall shape, each support plate comprising two long sides, i.e. one long side forming a guiding and manoeuvring edge, and another long side forming a free edge. The two short sides may or may not be straight.

According to one aspect, each support plate is preferably flat. This plate is then easy to manufacture from a cut blank. This is also an economical solution which minimizes re-machining operations.

According to one aspect, each support plate is made in one piece. This plate is then easy to wash since it does not have an assembly joint.

According to one aspect, each support plate is made of stainless steel or of a food-compatible metal alloy. For the support plates, this is favourable for lightness, durability and hygiene with regard to contact with food.

According to one aspect, an upper face of the support plate is defined, and nothing projects beyond the upper face apart, if necessary, for centring studs arranged at the periphery of the housings. Note that the upper faces of the plates in the working portion are flush with a working plane denoted PW.

According to one aspect, at least one groove is provided in the plate for holding the plate in particular when it is in the return orientation. This groove makes it possible to hold the plate along the return circuit and prevents the plates from slipping down and/or falling.

According to one aspect, the groove is arranged on the bottom face, while the notches are arranged in the top face or the edge face. Thus, the groove does not retain small waste and remains clean.

According to an alternative solution, at least one projection out of the plane is provided in the plate, or a rib, for holding the plate in particular when it is in the return orientation.

According to one aspect, an auxiliary guiding support is provided for supporting the support plates on the overhanging side, the free edge side, in the first portion.

According to one aspect, said auxiliary guiding support is removable, partially or entirely. It is thus possible, if necessary, to remove the auxiliary guiding support in order to have full access to the handling systems or to one of the modules of the machine.

According to one aspect, said auxiliary guiding support is carried by a piece of processing equipment of the machine, i.e. one or more process modules of which the line is made up. Thus, it is possible to dispense with a stand for holding this auxiliary support in a cantilevered manner.

According to one aspect, the second moving member is in the form of a chain conveyor or of an endless belt conveyor. This type of solution is rugged and robust, and very reliable. Alternatively, it is possible to provide motor-driven rollers as the second moving member.

According to one aspect, the second moving member may be in the form of a conveyor having an endless belt with two sets of teeth (one set of teeth on the inside for driving the belt and one set of teeth on the outside for driving the support plates with the belt).

According to one aspect, the system is such that the number of plates in the first portion TC1 is more than twice the number of plates in the second portion TC2. In this way, the total number of plates is minimized; the majority of the plates are used in the working portion and very few plates are present in the return portion. Note that, in a number of systems known from the prior art, the number of plates on the return path is equal to the number of plates in the outward working portion.

According to one aspect, the system is such that the average speed in the second portion TC2 is substantially greater, or even much greater, than the average speed in the first portion TC1. This characteristic may also result in the number of plates in the return portion being minimized.

According to one aspect, the second moving member may operate with momentum, with a speed pulse, and possibly an arrival brake. According to an alternative aspect, return by gravity may be provided.

According to one aspect, the second moving member may be in the form of a transfer shuttle with large pitches, a multiple of PX.

According to one aspect, the handling system is such that, at the rotation station PR1, a stop is formed for the returning vertical plates waiting for the ad hoc position of the rotary base. This function may be realized by a retractable stop. A collection zone for the returning plates is formed, with the excess plates waiting being stored at this location.

According to one aspect, the plates are adjacent in the first portion TC1, and use is made of operation by pushing. It is then sufficient to move the first plate forward in the first portion TC1, this simplifying the design of the transfer shuttle and reducing its cost.

According to one aspect, the first moving member, namely the transfer shuttle, individually engages all the plates or virtually all the plates in the first portion TC1. In this case, the plates do not push one another.

According to one aspect, the plates are spaced apart in the first portion TC1, with operation by transfer/moving forward with a pitch slightly greater than the length of the plate. Thus, a small functional clearance is formed, avoiding friction between the plates.

According to one aspect, it may be superfluous to use advancing indexing at the working stations; the forward movement controlled by the first moving member is enough to ensure the precision required for the arrival of the plate; only working indexing may be necessary after the operation.

According to one aspect, the plates have eight housings, or four or six or any other value. The invention works regardless of the number of housings provided in the plate.

According to one aspect, the plates have one to four rows of housings along the transverse direction Y, and one to four housings that are disposed along the longitudinal axis may be found in each row.

According to one aspect, the housings occupy a center lower area with regard to the support plate. Pots or bottles can extend downwardly from the support plate, between longitudinal edges of the support plates.

According to one aspect, the plates have a longitudinal length PX of between 250 mm and 680 mm, preferably between 360 mm and 520 mm, and even more preferably between 400 mm and 480 mm.

According to one aspect, the plates have a thickness of between 3 mm and 10 mm. According to one particular example, a thickness of between 6 mm and 8 mm may be chosen.

According to one aspect, the plates may be made in two parts, namely a flat plate with the housings and a technical profile element/member for the guiding and driving functions.

The present invention also relates to a machine for processing pots or bottles for food products, comprising a handling system as described above.

Thus, the process modules can pass above and below without being impaired by the plate supports.

Further aspects, aims and advantages of the invention will become apparent from reading the following description of an embodiment of the invention, given by way of non-limiting example.

BRIEF DESCRIPTION OF THE DRAWINGS

The invention will also be understood better from studying the appended drawings, in which:

FIGS. 18 to 21 illustrate another embodiment, among which:

DETAILED DESCRIPTION

In the various figures, the same references denote identical or similar elements. For reasons of clarity of the description, certain elements may intentionally not be depicted to scale in the drawings.

General Features and General Arrangement

Figure 1:
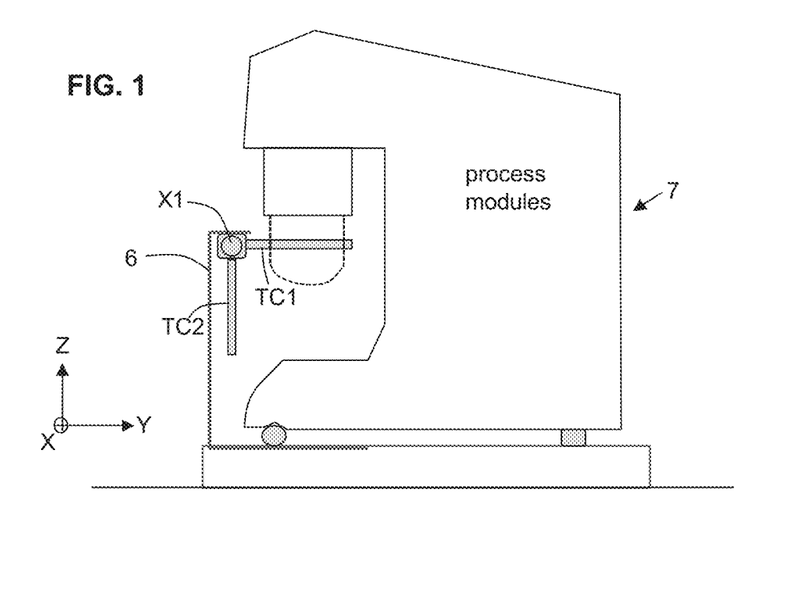
FIG. 1 illustrates a profile view of a machine or equipment comprising a plate system according to the present invention.
Figure 2:
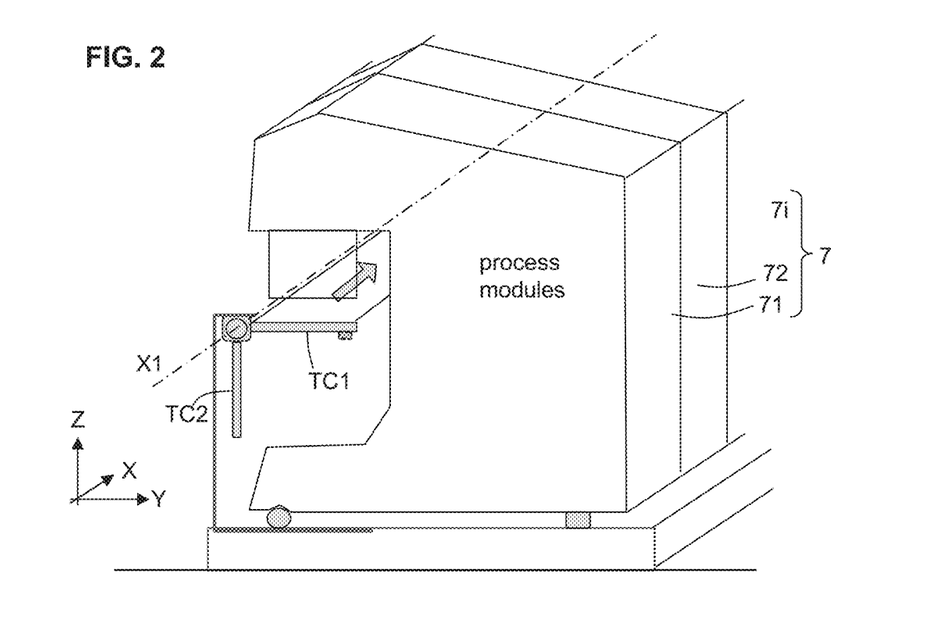
FIG. 2 illustrates a perspective view of the machine in FIG. 1.

FIGS. 1 and 2 show a machine processing containers for food products. These may be milk products, syrups, beverages of all kinds, or even pasty or powdery products, without excluding ice creams and animal feed. The present invention applies in fact to any food product.

In particular the handling system employed in these machines is of interest here. However, note that the handling systems described below are applicable to any production line, even outside the food sector.

Returning to the food sector, these machines/equipment/lines are used to fill containers, for example pots or bottles, with one or more food products, for example a dairy product and/or food components, and to hermetically seal these containers. Optionally, marking, labelling or prior disinfection operations may also be provided. Any other operation is not ruled out, however. FIGS. 1 and 2 illustrate processing modules that are juxtaposed in the axial direction of the machine and respectively bear the references 71, 72, 7i. The different processing modules or process modules collectively bear the reference 7.

Supports, referred to as support plates, or even simply as plates, are used to support the containers during the operations carried out in the machine.

These supports, which generally bear the reference 1, travel through a looped, that is to say closed, circuit, in the machine, and they return empty after the processed container(s) has/have been unloaded from them.

According to a general arrangement, the handling system comprises a first portion TC1, known as the working portion. Moreover, the handling system comprises a second portion TC2, known as the rapid return portion.

Note here that the combination of the first portion TC1 and of the second portion TC2 jointly forms, with the rotation stations, described below, at the ends, a closed circuit, that is to say a looped circuit in normal operation.

At one location, each support plate 1 is loaded with empty containers, and at another, downstream, location, the filled containers are removed from the support plate 1.

Each support plate 1 comprises one or more housings 18, each housing 18 being able to hold a container.

According to a first possibility, the container is held at the top, in which case an upper edge 58 of the container bears on an edge of the housing under the effect of gravity. The housing may be in the form of an orifice. According to this first possibility, the container is typically a pot 5 with a collar 58 wider than its body.

According to another possibility, the container can be received by lateral insertion, a throat of the container being accommodated in a housing having a mouth and a narrowing. After the throat of the container has passed through the narrowing, the container remains held in a hole with a size corresponding to the size of the throat. According to this other possibility, the container is typically a bottle with a throat and a neck.

Figure 18:
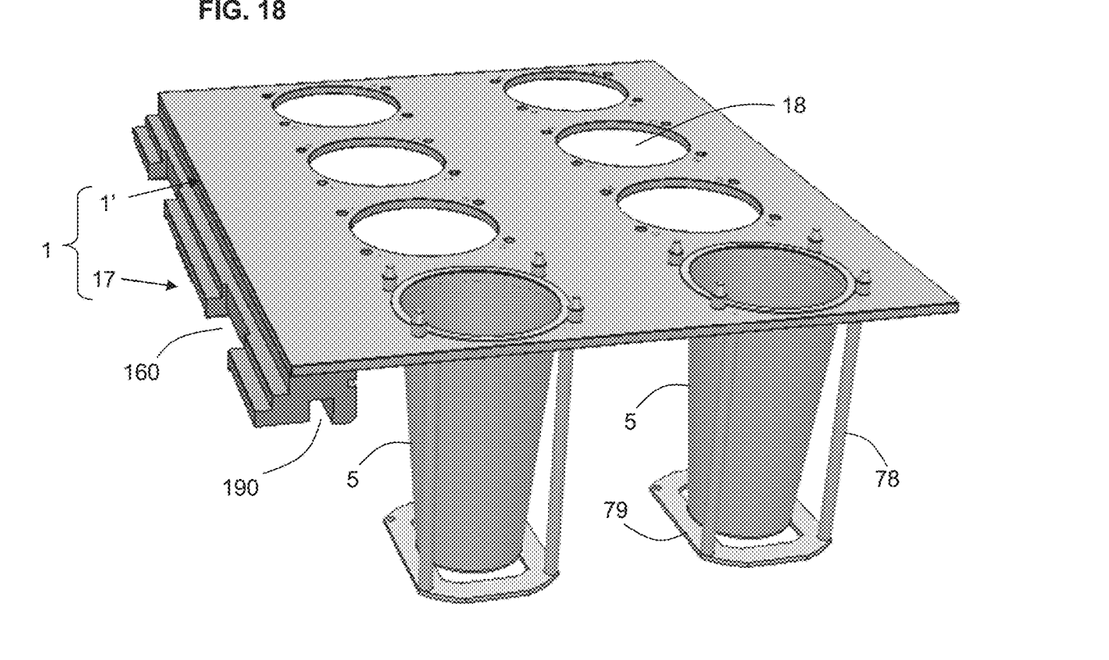
FIG. 18 illustrates a perspective view of a plate, and illustrates a variant relating to the holding of the containers in the housings in the plates.

According to yet another possibility, illustrated in FIG. 18, the case in which there is no collar in the upper part is provided.

The number of housings may be four or eight. However, there may be any number of housings, from two to 16. The number of rows along the transverse axis Y may be one, two, or even four rows; in each of the rows, there may be from one to four housings.

According to a general arrangement, the handling system comprises a first end E1 and a second end E2.

Figure 3:
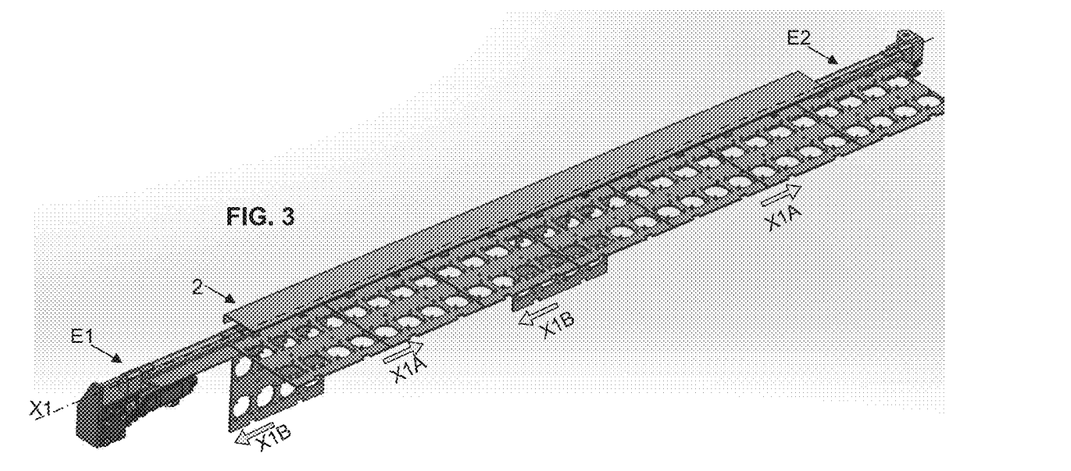
FIG. 3 illustrates a perspective view of a handling system according to one embodiment of the invention.
Figure 4:
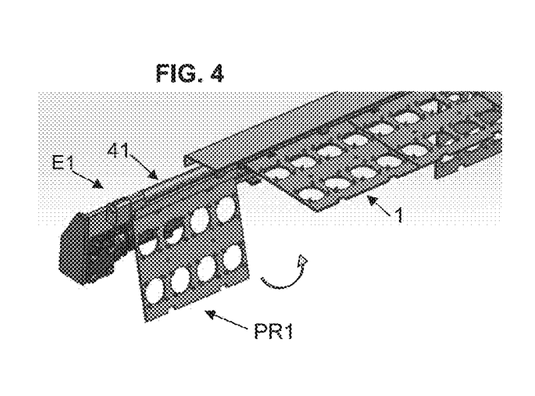
FIG. 4 illustrates a perspective view of the region of the first rotation station arranged at a first end of the system.
Figure 5:
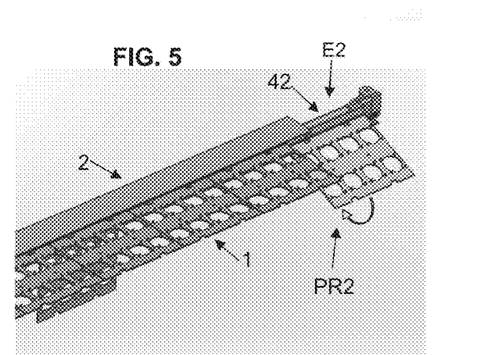
FIG. 5 illustrates a perspective view of the region of the second rotation station arranged at a second end of the system.

As illustrated in FIGS. 3 to 5, according to a general arrangement of the system, a first rotation station PR1 arranged at the first end E1 and configured to pivot the support plates into the horizontal position in order to engage them in the first portion TC1 is provided. Moreover, a second rotation station PR2 arranged at the second end E2 and configured to pivot the support plates into the return orientation in order to engage them in the second portion TC2 is provided.

The working longitudinal axis (i.e. of the machine) is denoted X; a reference longitudinal axis of the handling system denoted X1 is defined. The transverse axis of the machine is denoted Y and the local vertical axis is denoted Z.

Figure 17:
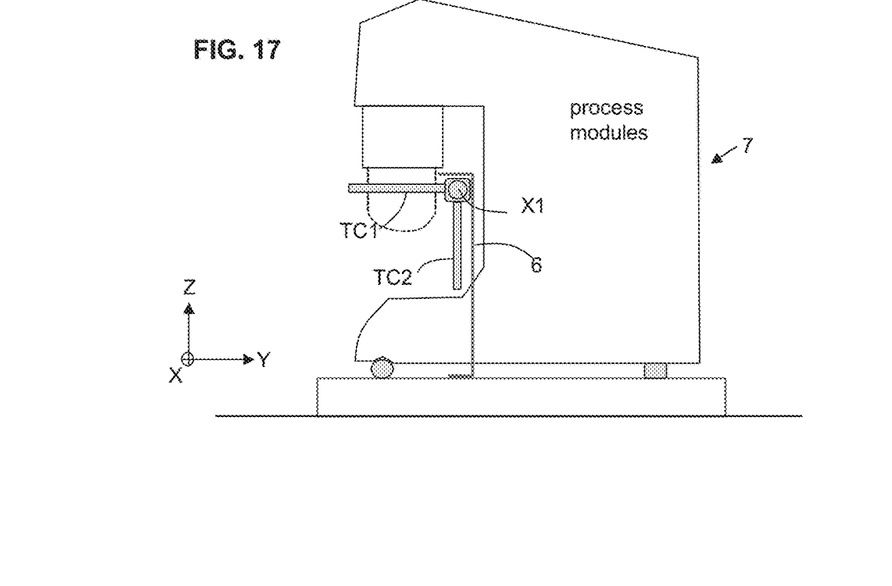
FIG. 17 is similar to FIG. 1 and shows a variant of the general arrangement of the handling system with respect to the machine.

The entire handling system is supported by a general support frame referenced 6 (depicted only generically in FIGS. 1, 2 and 17).

Note that two configurations are possible. In FIGS. 1 and 2, the axis X1 is situated on the outside of the machine, meaning that the plates 1 in the portion TC1 are located between the axis X1 and the process modules 7. In FIG. 17, the opposite is the case, and so the axis X1 is situated on the inside of the machine, meaning that the axis X1 is located between the plates 1 in the first portion TC1 and the process modules 7.

Support Plates and Their Circulation

As can be seen in FIGS. 3 to 9 and 11A, 11B, 11C and 12, each support plate 1 extends generally in a reference plane PR with a rectangular overall shape. Each support plate comprises two short sides, referenced 13 and 14, respectively, parallel to the Y direction of the machine. Each support plate has two long sides parallel to the longitudinal direction X of the machine, namely a first long side 11 forming a guiding and manoeuvring edge, and another long side 12 forming a free edge. The longitudinal length denoted PX is in this case between 400 mm and 480 mm. However, more generally, the length PX may be between 250 mm and 680 mm, or between 360 mm and 520 mm. Note that a small longitudinal clearance may be provided between the plates.

The width of the plate, denoted LW, is in this case between 250 mm and 350 mm. However, more generally, the width LW may be between 200 mm and 500 mm.

Each support plate is made in one piece. Each support plate is flat. The thickness of a plate EPP may typically be between 3 and 10 mm. Typically, the starting point is a blank of constant thickness and notches and grooves are made therein, which will be discussed below. According to one example, the thickness EPP may be 8 mm. According to another example, the thickness EPP may be between 6 mm and 8 mm.

Each support plate 1 comprises an upper face 1A and a lower face 1B.

Each support plate 1 can be made of stainless steel or of a food-compatible metal alloy. However, a material of the food-compatible hard plastic type, such as polypropylene or polycarbonate may also be suitable.

In the first portion TC1, the support plates circulate in a horizontal position in a first axial direction X1A. In the various illustrations, the plates are adjacent to one another in the first portion. However, they are not precluded from being slightly spaced apart from one another.

In the return portion TC2, the support plates travel forward in a second axial direction X1B opposite to the first axial direction. In this second portion TC2, the support plates circulate in a position/stance or orientation which is different from the horizontal position/stance. The term "return orientation" is used for this position/stance. Said return orientation is vertical in the example depicted. In a variant that is not shown, the return orientation may be angularly less than 30° away from the vertical, that is to say not far away from the vertical position.

The first long side 11 forms a guiding and manoeuvring edge. The guiding and driving functions are located in the vicinity of this long side. The edge corresponding to this long side is received in one or more groove(s) for guiding and receiving guides and rotary bases, as will be described below.

The opposite edge/side 12 is only guided but not driven. The drive is thus relatively simple and is located in the vicinity of the longitudinal axis X1 of the handling system. The support plate is held and driven in a cantilever manner. The area situated below the plate and on the opposite edge are free from driving mechanism, the areas situated below the plate and on the opposite edge are dedicated to pots and/or bottles to be retained by the support plates.

Figure 9:
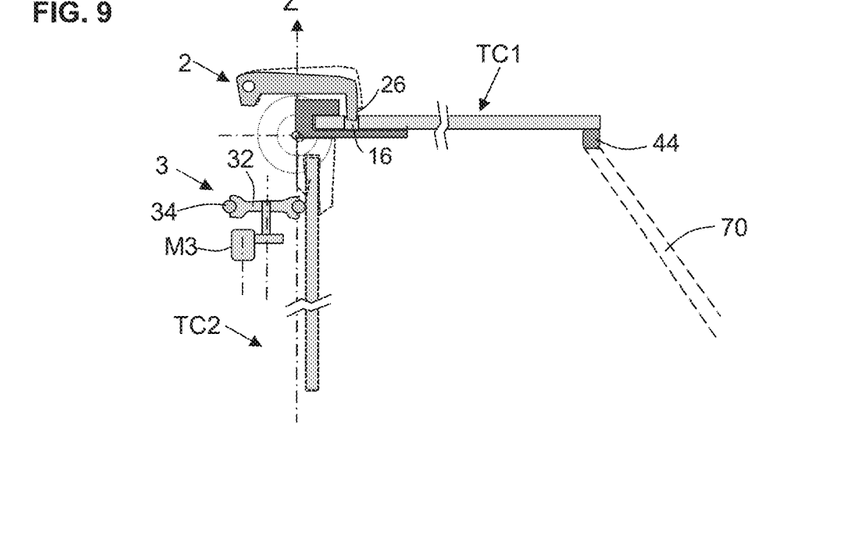
FIG. 9 illustrates a cross section through the handling system with the auxiliary support guide.

According to another characteristic, the opposite long edge 12 may be supported by an auxiliary guide 44. This auxiliary guide may be continuous or discontinuous; as illustrated in FIG. 9, this auxiliary guide 44 may be carried by an arm 70 secured to one of the abovementioned process modules 7i. This auxiliary guide 44 is preferably removable.

Figure 11:
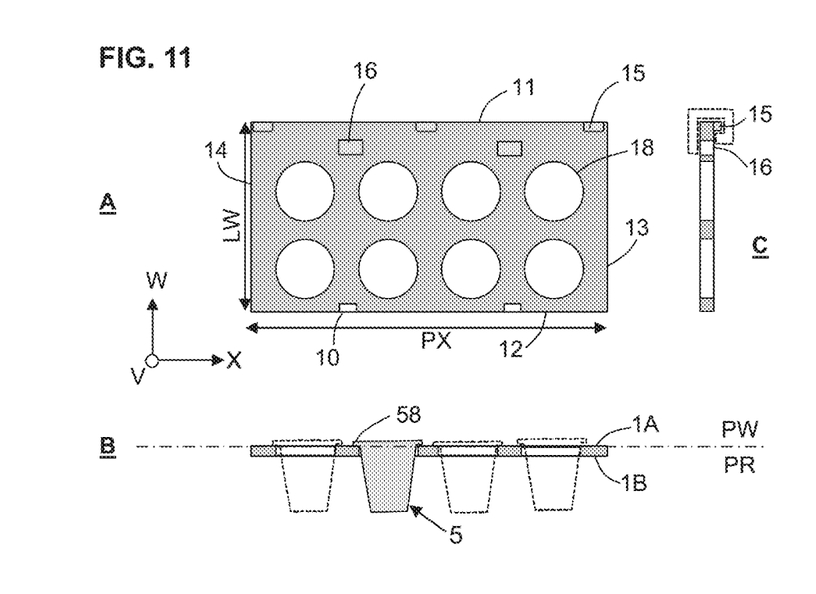
FIG. 11 illustrates a plate in a top view (A), a side view (B) and a frontal view (C)
Figure 12:
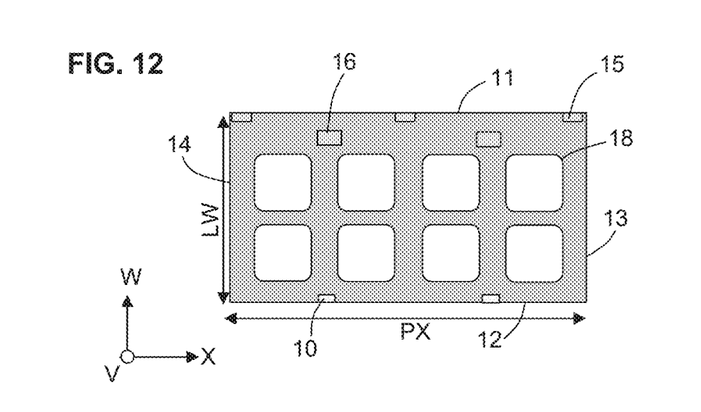
FIG. 12 illustrates a frontal view of a plate variant.

With reference to FIGS. 11 and 12, it can be seen that the housings provided in the support plate can be round or square depending on the shape of the pots to be processed.

Each support plate comprises at least one notch 16 for receiving a finger of the first moving member. Note that the notch(es) 16 preferably pass(es) through the thickness of the plate. This is easy to clean and prevents contaminants from getting trapped in a blind hole.

In the example illustrated, each support plate comprises two notches.

Moreover, according to one option, a protrusion 15 forming a projection out of the plane is provided, this serving to keep the plate in particular in its vertical orientation.

According to one configuration, rather than a protrusion, a longitudinal groove referenced 19 is used to hold the plate, a longitudinal rib 28, 29 provided in plate guiding means being accommodated in said groove.

In a variant that is not shown, the position of the notches 16 for the forward travel of the plates and the position of the longitudinal groove 19 for holding and guiding may be coincident.

Moreover, auxiliary notches referenced 10 may be provided, which may be used for the purposes of indexing at the processing stations.

Note also that the plate may have a square rather than rectangular overall shape.

Moreover, note that the short sides are not necessarily straight and may comprise a convex or concave step.

Moving Members

Provided in the first portion is a first member 2 for moving the support plates along the first axial direction X1A. In an illustrated configuration, the first member is of the stepping type. However, note that any other moving mechanism can be envisaged in the scope of the present invention.

The first moving member 2 comprises, in the example illustrated, a transfer bar 21 which extends generally along the axial direction and is mounted so as to pivot about the axis X1.

The transfer bar 21 of the first moving member 2 comprises a finger 26 at a distance from the axis X1 and configured to be received in a notch 16 in the plate, the finger and the transfer bar being unladen when the finger 26 is not engaged.

Figure 13:
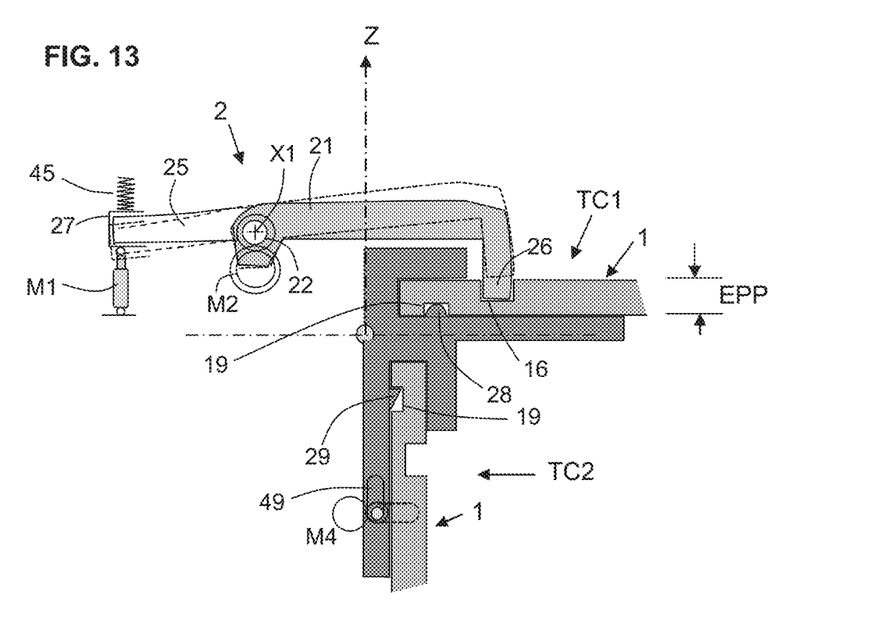
FIG. 13 is similar to FIG. 9 and illustrates in more detail a cross section through the handling system according to one variant, at the longitudinal axis.
Figure 14:
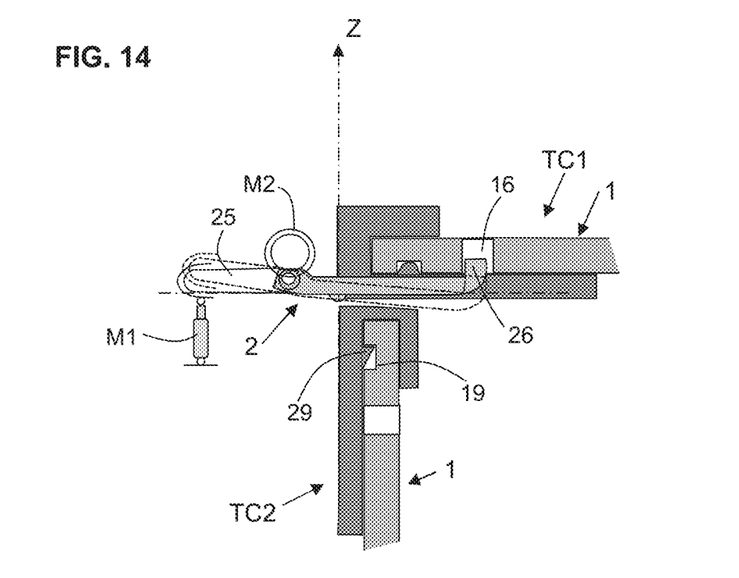
FIG. 14 is similar to FIG. 9 and illustrates in more detail a cross section through the handling system according to another variant, at the longitudinal axis.

As illustrated in FIGS. 13 and 14, the transfer bar 21 of the first moving member 2 operates with two degrees of freedom, namely a rotation about X1 and a forward movement along the axial direction. The rotation allows the engagement and disengagement of the finger 26 in and from a notch 16.

Figure 10:
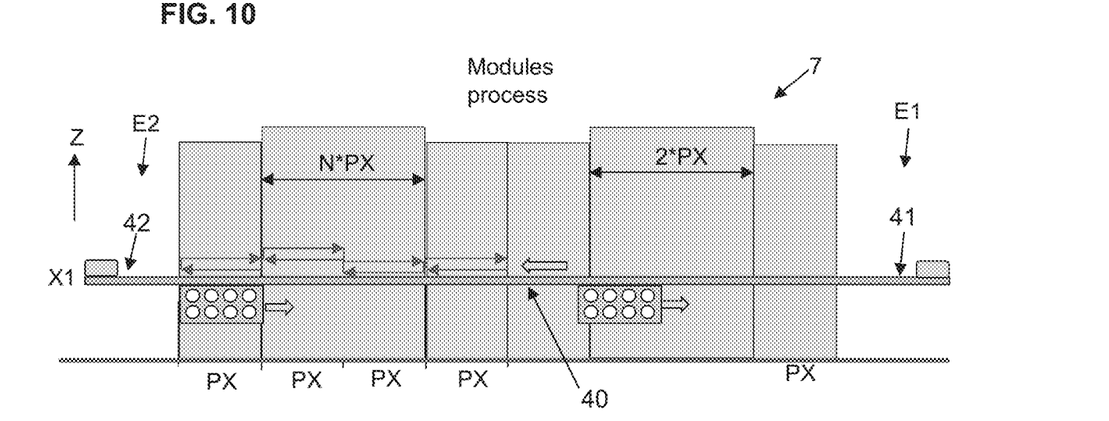
FIG. 10 shows a frontal view of the machine.

The axial movement in translation makes it possible to move one or more plates forward by a predetermined distance in the first portion. In the example illustrated in FIG. 10, the predetermined distance coincides with the axial length of the plate, namely the pitch PX. According to other possibilities, for example with two notches per plate, the forward travel distance on each movement of the transfer bar may be PX/2. According to other possibilities, for example with four notches per plate, the forward travel distance on each movement of the transfer bar may be PX/4.

The axial movement in translation is realized by a screw-nut or rack mechanism, and it is generally possible to use an axial translation mechanism known per se. An axle shaft denoted 22, which may be fixed or secured to the transfer bar itself, is provided. The device also comprises a motor denoted M2, or a geared motor, which is placed in the vicinity of the axle shaft. An output pinion engages with a rack or a helical toothset in order to move the transfer bar 21 along the longitudinal direction X1, with rotation of the axle shaft 22 or not depending on the possible configurations.

Where the engaging and disengaging movement of the finger is concerned, the transfer bar is equipped with a rear lever referenced 25 securely connected to the body of the transfer bar so as to rotate as one therewith; moreover, the rear lever 25 is received in a longitudinal sliding connection 27. The rear lever 25 can thus slide along X1 in the slide 27. As in the case illustrated in FIG. 13, a single-acting control cylinder denoted M1 and a return spring 45 are provided. The effect of the return spring is to tilt the transfer bar about the axis X1 to the disengaged position of the control finger 26, whereas, by contrast, the actuation of the cylinder M1 has the effect of tilting the transfer bar in the opposite direction and engaging the control finger in the notch 16.

FIG. 14 illustrates the case of a double-acting cylinder; in this case, the cylinder is commanded in one direction to disengage the control finger, and commanded in the opposite direction to engage the control finger 26 so as to move the plates forward.

Thus, the first moving member 2 can be referred to as a "transfer shuttle". Any other solution for causing at least one plate to move forward by a predetermined distance can also be envisaged.

As regards the number of fingers 26, as many fingers can be provided as there are spaces for support plates in the first working portion; under these conditions, the transfer shuttle simultaneously engages all the plates situated in the working portion TC1. Thus, the transfer bar 21 and the axle shaft 22 travel along more or less the entire length of the handling system, possibly except for the ends. Thus, the plates do not push one another and are not necessarily adjacent, there may be a small gap forming a functional clearance. This also makes it possible to operate the tested machine with only a few plates.

In another variant, the transfer shuttle engages only the first plate situated at the start of the first portion and the plates push one another as far as the end of the first portion. The axle shaft and the transfer bar are thus much shorter, that is to say the order of magnitude corresponds to the length of a plate PX or slightly more.

Figure 15:
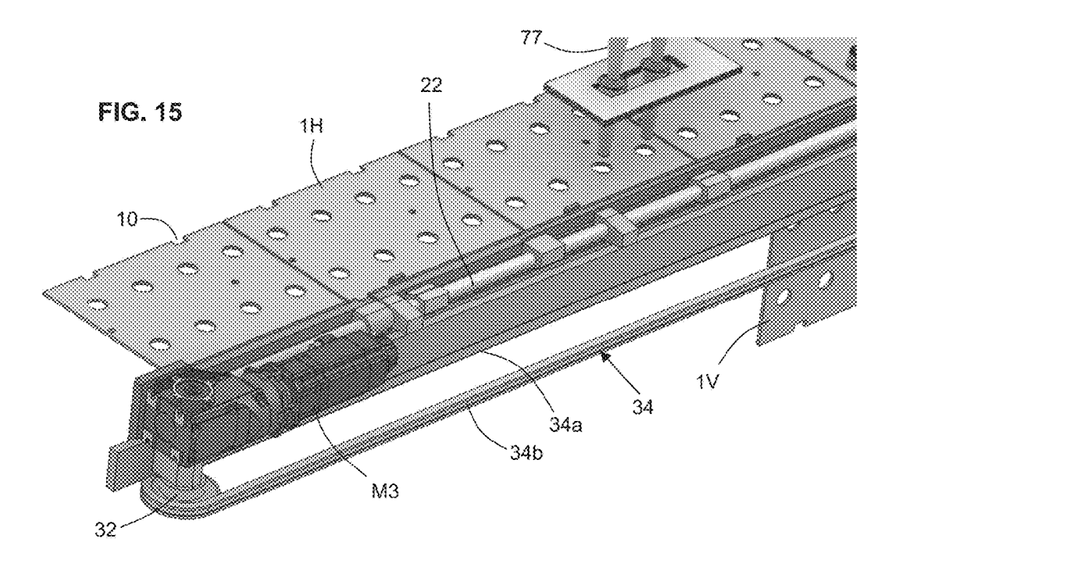
FIGS. 15 and 16 illustrate the second return conveyor, in this case in a variant having a belt, and the drive thereof, the whole having the function of driving the vertically returning plates along the second portion.

Alternatively, the transfer shuttle may work underneath, as illustrated in FIGS. 14 and 15, this case being illustrated below. When the transfer bar 21 is situated beneath the upper face 1A of the plates in the working portion, the region situated above the working plane referenced PW is free of any element that may represent an impairment or risk of contamination.

When the cylinder M1 pushes upward, the control bar tilts about X1 and the control finger 26 is disengaged from the notch 16. By contrast, when the cylinder M1 pushes downward, the control bar tilts in the opposite direction about X1 and the control finger 26 is engaged in the notch 16.

The handling system comprises a second moving member 3 configured to move the support plates in the second axial direction X1B in the second portion TC2. The second moving member is preferably of the continuous or discontinuous type.

Figure 16:
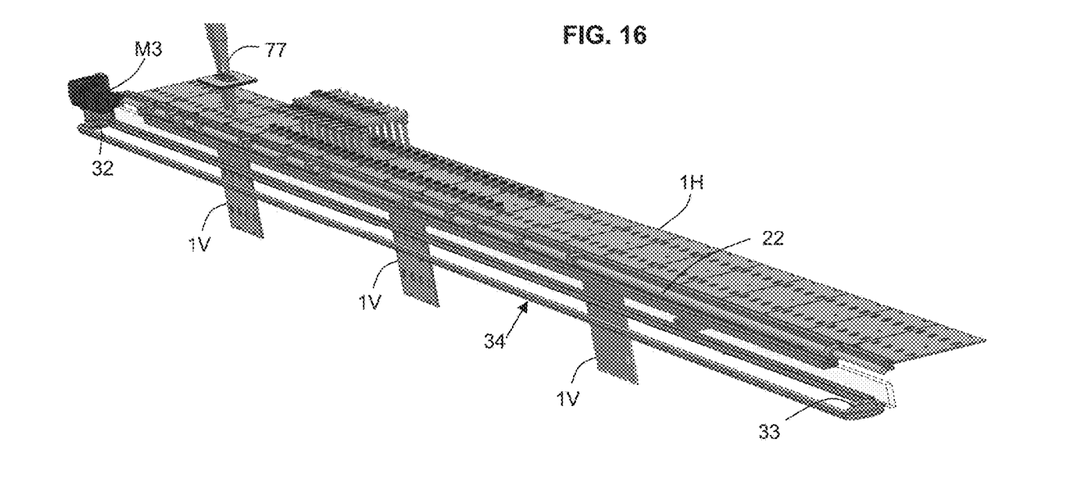

As can be seen in FIGS. 9, 15 and 16, the second moving member comprises an endless belt referenced 34. This belt is guided and driven by two belt pulleys, one of which is a driving pulley 32 driven by a motor M3 and one of which is a follower pulley 33 at the other end of the belt. The belt rubs against the lower face 1B of the plates, in the return orientation position, namely in the vertical position, in order to drive them from the second end E2 to the first end E1.

According to one example, the belt has two sets of teeth: one set of teeth on the inside for driving the belt with the pulley and one set of teeth on the outside for driving the support plates with the belt.

Rather than the belt, the second moving member may be formed by a chain of articulated links mounted in a loop on two sprockets at the ends. A first sprocket is a driving sprocket and the other is mounted on a support returned elastically by a spring in order to tend to maintain sufficient tension in the chain permanently. Shoes fixed on the outside of certain links of the looped chain may be provided in order to bear on the plates in their vertical position and to drive the plates.

More specifically, a working strand 34a is arranged in contact with the plates which are located in the second portion, while a return strand 34b is at a distance from the plates and serves for the unladen state. The rate of forward movement of the working strand of the belt is relatively fast. In practice, it is at least equal to the rate of forward movement of the transfer bar in the opposite direction. For example, the rate of forward movement of the belt 34 may be at least equal to 500 mm per second.

The drive of the plates in the second portion could be different from the one illustrated, for example a system involving a pulse, return by gravity, or any other solution made possible by the fact that there is no working operation on the plates in this return portion.

The drive of the plates in the second portion could be realized by a transfer shuttle with a large pitch (a multiple of PX).

Figure 6:
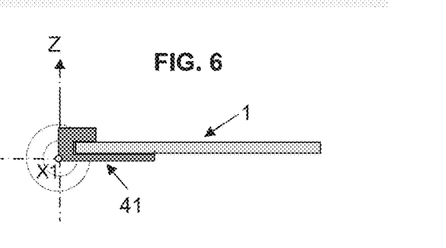
FIG. 6 illustrates a cross section through the handling system in the first portion, known as the working portion.
Figure 7:
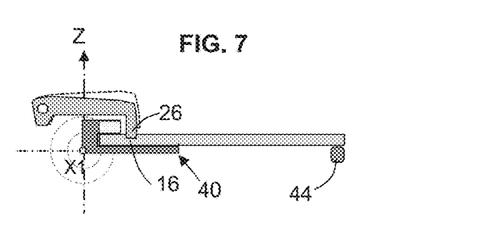
FIG. 7 is similar to FIG. 6, also illustrating the first moving member.
Figure 8:
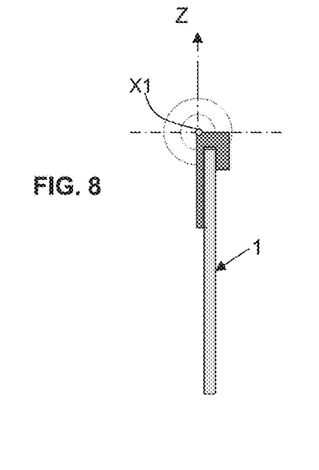
FIG. 8 illustrates a cross section through the handling system in the second portion, known as the return portion.

As illustrated in FIGS. 6 to 8, the first rotation station PR1 comprises a first rotary base 41 on the side of the first end E1. The first rotary base pivots the support plates into the horizontal position in order to engage them in the first portion TC1. The first rotary base may be in the form of an element mounted so as to rotate about an axis coincident with X1 or close to the latter, this element being driven into angular position by a geared motor with two end-of-travel sensors or a stepping motor with an end-of-travel sensor.

The first rotary base 41 is therefore movable between a first position suitable for receiving a support plate arriving in the second portion in a return orientation and a second position suitable for placing a support plate in a horizontal position at the inlet of the first portion.

A retractable stop 49 may be provided, which makes the inlet of a returning vertical plate into the rotary base 41 dependent on a vertical receiving position of this rotary base. The retractable stop 49 may be controlled selectively by a small actuator M4. In a variant, the retractable stop may be a form integrated into the flank of the rotary base 41, without requiring a specific control other than the rotation of the rotary base 41.

This retractable stop is not necessary if a transfer shuttle is used for the return portion.

On the side of the second end E2, the second rotation station PR2 comprises a second rotary base 42. The second rotary base pivots the support plates into the return orientation in order to engage them in the second portion TC2.

The second rotary base may be in the form of an element mounted so as to rotate about an axis coincident with X1 or close to the latter, this element being driven into angular position by a geared motor with two end-of-travel sensors or a stepping motor with an end-of-travel sensor. If the path is free, the second rotary base pivots the plate into a vertical position and inserts it immediately into the second return portion TC2.

Each of the rotary bases comprises a groove for receiving the longitudinal edge, i.e. the long side 11 forming a guiding and manoeuvring edge.

Both the first rotary base and the second rotary base comprise a plate holding means. When the plate contains a projection out of the plane 15, the rotary bases comprise a housing forming a slide for receiving this projection out of the plane (cf. FIG. 11).

In a variant, each support plate 1 has a guiding groove 19. The rotary bases comprise a protruding rib 29 which supports the interior of the groove 19 formed in the plates. (cf. FIGS. 13 and 14, bottom part).

Moreover, a fixed main guiding support 40, disposed continuously along the first axial direction X1A, is provided between the first and second rotary bases 41, 42. The support is thus continuous for the plates from the first end E1 to the second end E2.

The main guiding support comprises a rib 28 which allows the longitudinal guiding of the plates, the rib 28 being received in the groove 19.

As illustrated in FIG. 13, the main guiding support is in the form of a profiled element having a generally constant section along X1. This profiled element makes it possible to guide the plates in a horizontal position which pass through the first portion TC1, and also to guide the plates in a vertical position in the second portion TC2, in which they return.

This type of system with support plates can also be used in machines or installations which process containers for non-food products, to which the present invention may be applied.

Operation

In the first working portion, the plates are moved sequentially from one station to another by the first moving member 2 described above. The plates are in a horizontal position referenced 1H in FIGS. 15 and 16. Depending on the configuration of the machine, various operations are carried out at a fixed station, in the period of time between the outward movements of the transfer bar. According to a very simplified example, illustrated in FIG. 15, metering nozzles referenced 77 are provided, located at the location of one of the positions of the plate.

At the end of the working portion TC1, the second rotary base 42 rotates each support plate 1 about the reference longitudinal axis X1 through an angle θ (90° in a typical case). Thereafter, each plate travels along the return portion, substantially maintaining this orientation. The plates are in a vertical position referenced 1V in FIGS. 15 and 16. The plates are moved along the second portion TC2 by the second moving member 3 described above.

Thereafter, the first rotary base 41 rotates the support plate with a rotation in the opposite direction about the longitudinal axis X1 through an angle −θ, that is to say opposite to the angle applied by the second rotary base.

In relation to the full operation in a loop, note that the first portion TC1 is entirely occupied by the plates, while the second portion TC2 comprises only a few plates, as can be seen in FIG. 16.

Thus, the number of plates in the first portion may be between about ten and about 30 depending on the configuration of the machine. By contrast, there are only one to four plates in the return portion TC2. Advantageously, the total number of plates required for the handling system and the process of the installation is minimized.

Other Embodiment

FIGS. 18 to 21 illustrate another embodiment. Note that in the following text, everything that is not described in particular should be considered as being identical or similar to the description given above for the handling system in relation to FIGS. 1 to 17.

In this case, the plates are made in two parts, namely a flat plate part denoted 1' with housings 18, and also a technical profile member 17 for the guiding and driving functions. The technical profile member/element 17 for guiding and driving has a guiding groove 190, the functions of which are identical to the above-described groove 19.

In this case, the technical profile element 17 for guiding and driving has two notches 160 arranged in the edge face of the plate, on the side of the long side.

The technical profile element 17 has a length PX identical to the longitudinal dimension of the plate PX. The flat plate 1' is obtained from a blank in which drilled holes are made, and therefore it is easy to produce.

The technical profile element 17 is fixed under the plate, i.e. fixed to the lower face 1B of the plate 1'. Nothing protrudes from the upper plane 1A of the plate. The technical profile element 17 is obtained by moulding plastic.

Figure 19:
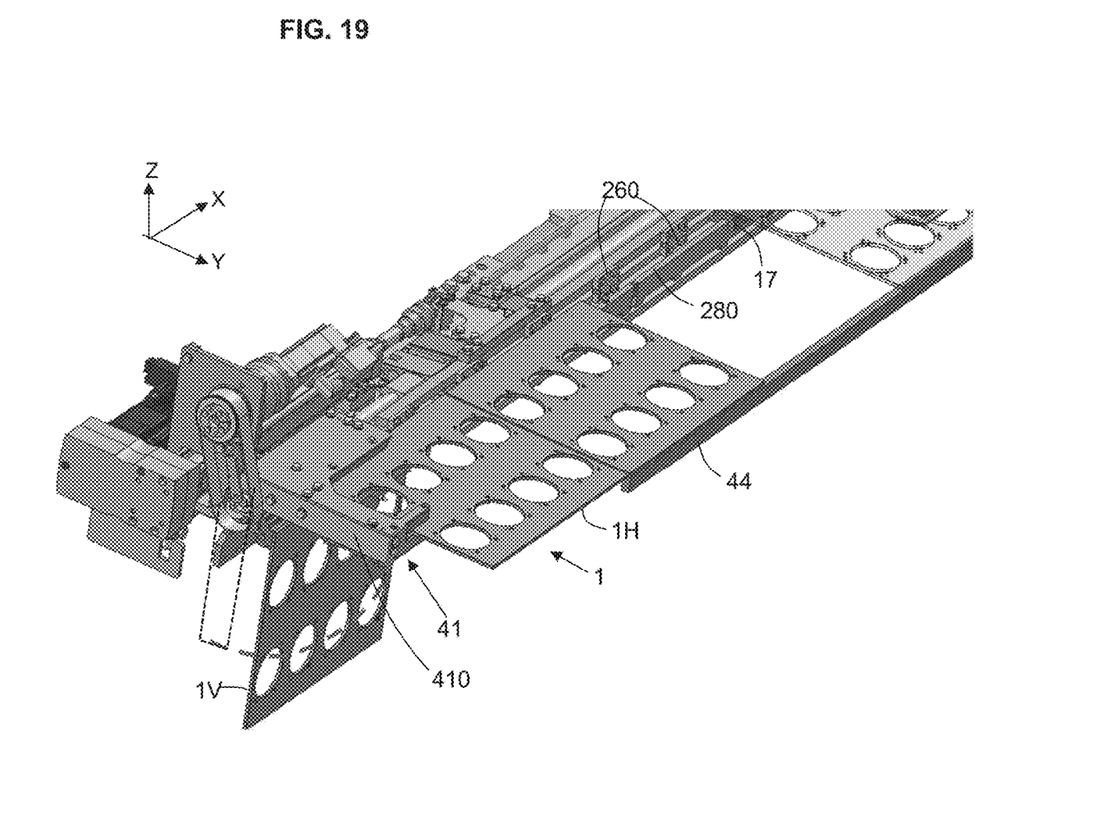
FIG. 19 illustrates a part of the handling system as seen from the first end.
Figure 20:
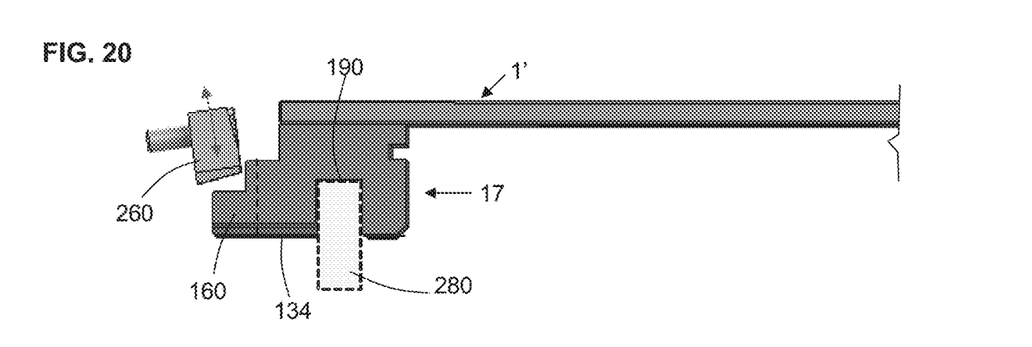
FIG. 20 illustrates a plate in a view along the axis, with the guiding and driving means in more detail.

With reference to FIGS. 19 and 20, one plate has been removed, and another rendered transparent, but its technical profile element 17 is shown. The grooves 190 receive a guiding rail 280 fixed to the machine, said rail extending along the length of the machine between the rotary bases 41, 42. The transfer shuttle comprises fingers referenced 260. These fingers 260 are mounted on a transfer bar which may selectively pivot about an axis of the first moving member and move longitudinally forward by a predefined pitch (PX, PX/2, PX/4). In FIG. 20, the dotted arrow shows the engaging and disengaging movement of the finger 260 with respect to the notch 160.

The rotary base 41 also comprises a guiding rib with which the groove 190 engages. The rotary base 41 comprises an arm 410 forming a longitudinal stop. In FIG. 19, the dotted line shows the rotational movement of the end of the arm 410.

Note that the length of the arm 410 is shorter than the width LW of the plates. In one example, the length of the arm 410 is around 50% of the width LW.

According to a variant which can be applied to all the embodiments, the containers which do not have a collar are processed in a particular case (cf. FIG. 18). In this case, the container does not rest directly on the plate but on a shoe 79 arranged at a distance beneath the plate, this distance corresponding to the height of the container 5 to be processed. This shoe is connected to the plate by four small posts 78.

Further, the bottom face of the technical profile element 17 is fitted with protrusions 134 or small teeth.

Figure 21:
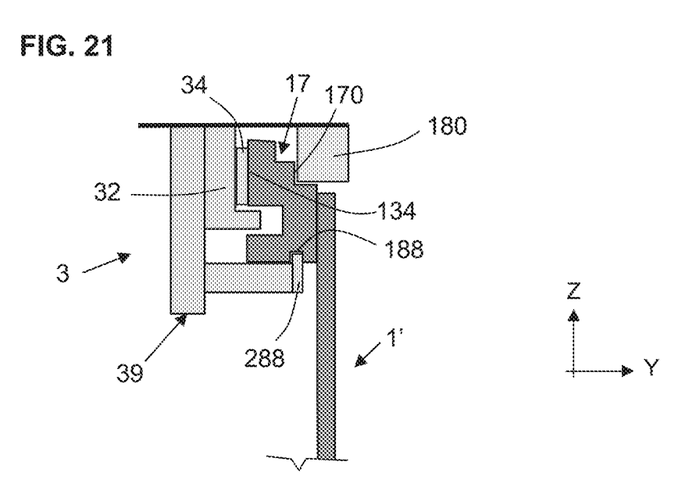
FIG. 21 shows a cross section through the handling system in the second portion, known as the return portion.

Said protrusions cooperates with driving belt 34 already disclose in the above embodiment, this is apparent in particular in FIG. 21.

Turning now to FIG. 21, in the plate return section, i.e. second portion TC2, the support plate 1 is only held via the technical profile element 17. More precisely there is provided on the one hand a groove 188 on the profile element 17, and on the other hand a support rail denoted 288, rigid with the machine support frame 6, in particular here a strength member 39.

Rail 288 receives the groove 188 and provide reliable guidance along X axis. Further, the rail supports the weight of the support plate 1,1'.

Regarding along Y axis, the profile element 17 is interposed between driving belt 34 and a stop member denoted 180 on which abuts a shoulder 170 of the profile member 17. Driving pulley 32 drives driving belt 34 as already exposed above.

According to one particular aspect, we note here that the support plate 1 exhibits only mechanical functions, the support plate does not comprise any pneumatic function, pneumatic port or pneumatic conduit.

The invention claimed is:

1. A handling system in a machine for processing containers intended to hold a food product, the handling system comprising:
   a plurality of support plates circulating in a closed circuit, each support plate comprising one or more housings, each housing being able to hold a container,
   a first portion, known as the working portion, in which the support plates circulate in a horizontal position in a first axial direction, with a first member for moving the support plates along the first axial direction, the first member preferably being of the stepping type, the support plate being driven at only one of its two longitudinal sides corresponding to a first long side forming a guiding and maneuvering edge, the other longitudinal side corresponding to another long side forming a free edge,
   a second portion, known as the rapid return portion, with a second moving member configured to move the support plates along a second axial direction opposite to the first axial direction, wherein the support plates circulate in the second portion in a return orientation, said return orientation being vertical or angularly less than 30° away from the vertical,
   and in that the handling system comprises:
   a first rotation station arranged at a first end of the handling system and configured to pivot the support plates into the horizontal position in order to engage them in the first portion, and
   a second rotation station arranged at a second end of the handling system and configured to pivot the support plates into the return orientation in order to engage them in the second portion.

2. The system according to claim 1, wherein the first rotation station comprises a first rotary base and the second rotation station comprises a second rotary base and a fixed main guiding support, disposed continuously along the first axial direction, is provided between the first and second rotary bases.

3. The system according to claim 1, wherein the first moving member comprises two degrees of freedom, namely rotation about the axial direction and forward movement along the axial direction.

4. The system according to claim 1, wherein each support plate comprises at least one notch for receiving a finger of the first moving member, preferably two notches.

5. The system according to claim 1, wherein the first moving member comprises a finger at a distance from the axis and configured to be received in a notch in the plate, the finger being unladen when the finger is not engaged.

6. The system according to claim 1, wherein each support plate extends generally in a reference plane with a rectangular overall shape.

7. The system according to claim 6, wherein at least one projection out of the plane or a rib or a groove is provided in each plate for holding the plate in particular when it is in the return orientation.

8. The system according to claim 1, wherein an auxiliary guiding support for supporting the support plates on the overhanging side, i.e. on the side of the free edge, is provided.

9. The system according to claim 1, wherein the second moving member is in the form of an endless chain or belt conveyor or the moving member comprises motor-driven rollers.

10. The system according to claim 1, wherein it is provided that the number of plates in the first portion is more than twice the number of plates in the second portion.

11. The system according to claim 1, wherein, at the rotation station, a stop is formed for the returning vertical plates waiting for the ad hoc position of the rotary base.

12. A machine for processing pots or bottles for food products, comprising a handling system according to claim 1.

\* \* \* \* \*